US010228256B2

(12) United States Patent
Singh

(10) Patent No.: US 10,228,256 B2
(45) Date of Patent: Mar. 12, 2019

(54) SYSTEMS AND METHODS FOR PROVIDING NAVIGATION DIRECTIONS BASED ON EMOTIONS AND ACTIVITIES

(71) Applicant: PCMS Holdings, Inc., Wilmington, DE (US)

(72) Inventor: Mona Singh, Cary, NC (US)

(73) Assignee: PCMS Holdings, Inc., Wilmington, DE (US)

( * ) Notice: Subject to any disclaimer, the term of this patent is extended or adjusted under 35 U.S.C. 154(b) by 35 days.

(21) Appl. No.: 15/542,878

(22) PCT Filed: Dec. 28, 2015

(86) PCT No.: PCT/US2015/067649
§ 371 (c)(1),
(2) Date: Jul. 11, 2017

(87) PCT Pub. No.: WO2016/114918
PCT Pub. Date: Jul. 21, 2016

(65) Prior Publication Data
US 2017/0370736 A1 Dec. 28, 2017

Related U.S. Application Data

(60) Provisional application No. 62/103,594, filed on Jan. 15, 2015.

(51) Int. Cl.
*G01C 21/34* (2006.01)
*G01C 21/36* (2006.01)

(52) U.S. Cl.
CPC ..... *G01C 21/3415* (2013.01); *G01C 21/3484* (2013.01); *G01C 21/3602* (2013.01);
(Continued)

(58) Field of Classification Search
CPC .. G01C 2/3415; G01C 2/3484; G01C 2/3602; G01C 2/2629; G01C 2/2632; G01C 2/365; G01C 2/3655
See application file for complete search history.

(56) References Cited

U.S. PATENT DOCUMENTS 5,655,085 A   8/1997  Ryan
8,364,395 B2  1/2013  French
(Continued)

FOREIGN PATENT DOCUMENTS

DE  102008041948  3/2010
WO  2009143903    12/2009
WO  2010040385    4/2010

OTHER PUBLICATIONS

Notification of Transmittal of the International Search Report and the Written Opinion of the International Searching Authority for Application No. PCT/US2015/067649 dated Jul. 1, 2016, pp. 23.
(Continued)

*Primary Examiner* — Aaron L Troost
(74) *Attorney, Agent, or Firm* — Invention Mine LLC

(57) ABSTRACT

Systems and methods are described for improved navigation assistance by providing overview directions focusing on points where other users tend to make mistakes or display emotional responses, such as stress, that indicate that they feel they may make mistakes. In an exemplary method, a navigation process receives information about a present user's navigation route, the present user's status, and the user history. The navigation service compiles the received information and determines an enhanced navigation route.

24 Claims, 17 Drawing Sheets

(52) U.S. Cl.
CPC ....... *G01C 21/365* (2013.01); *G01C 21/3629* (2013.01); *G01C 21/3632* (2013.01); *G01C 21/3655* (2013.01)

(56) References Cited

U.S. PATENT DOCUMENTS

| | | |
|---|---|---|
| 8,417,448 B1 | 4/2013 | Denise |
| 8,862,317 B2 | 10/2014 | Shin |
| 2012/0150429 A1 | 6/2012 | Siotos |
| 2012/0150430 A1* | 6/2012 | French ............... G01C 21/3415 701/425 |
| 2013/0304382 A1 | 11/2013 | Nomoto |
| 2014/0052370 A1 | 2/2014 | Watanabe |
| 2014/0214322 A1 | 7/2014 | Tsimhoni |
| 2014/0309933 A1* | 10/2014 | Shin ................... G01C 21/3484 701/533 |

OTHER PUBLICATIONS

Kose, Mustafa, et. al., Online Human Activity Recognition on Smart Phones. 2nd International Workshop on Mobile Sensing, Apr. 16, 2012. ACM 978-1-4503-1227-1.

Yatani, Koji, et. al., "Bodyscope: A Wearable Acoustic Sensor for Activity Recognition", UbiComp 2012, Sep. 5-Sep. 8, 2012, ACM 978-1-4503-1224-0.

Fathi, Alireza., et al. "Learning to Recognize Objects in Egocentric Activities", College of Computing, Georgia Institute of Technology, Intel Labs Seattle, 2011, pp. 3281-3288.

Invitation to Pay Additional Fees, and Where applicable, Protest Fee for PCT/US2015/067649 dated Apr. 14, 2016.

Written Opinion of the International Preliminary Examining Authority for PCT/US2015/067649 dated Dec. 16, 2016.

International Preliminary Report on Patentability for PCT/US2015/067649 completed on Mar. 8, 2017.

* cited by examiner

| SECTION ID | NODE ID (FROM) | NODE ID (TO) | MEAN TRAVEL TIME (S) |
|---|---|---|---|
| S1 | A | B | 60 |
| S2 | B | C | 10 |
| S3 | C | D | 30 |
| S4 | C | E | 75 |
| S5 | E | C | 70 |
| S6 | D | C | 25 |

FIG. 12B

| USER | RECOMMENDED SECTION | ACTUAL SECTION | TIME (S) |
|---|---|---|---|
| U1 | S1 | S1 | 55 |
| U1 | S2 | S2 | 11 |
| U1 | S3 | S4 | 80 |
| U1 | S3 | S5 | 80 |
| U1 | S3 | S3 | 32 |
| U2 | S1 | S1 | 55 |
| U3 | S2 | S2 | 11 |
| U4 | S3 | S3 | 80 |
| U5 | S1 | S1 | 55 |
| U6 | S3 | S3 | 70 |
| U7 | S3 | S3 | 66 |
| U8 | S3 | S3 | 77 |
| U9 | S3 | S3 | 78 |

FIG. 12C

| USER | RECOMMENDED SECTION | ACTUAL SECTION | TIME (S) |
|---|---|---|---|
| U0 | S2 | S2 | |
| U0 | S3 | | |

FIG. 12D

| USER | RECOMMENDED SECTION | ACTUAL SECTION | TIME (S) | ACTIVITY |
|---|---|---|---|---|
| U1 | S1 | S1 | 55 | |
| U1 | S2 | S2 | 11 | |
| U1 | S3 | S4 | 80 | |
| U1 | S3 | S5 | 80 | |
| U1 | S3 | S3 | 32 | |
| U2 | S1 | S1 | 55 | |
| U3 | S2 | S2 | 11 | |
| U4 | S3 | S4 | 500 | FILLING GAS |
| U4 | S3 | S5 | 80 | |
| U4 | S3 | S3 | 29 | |
| U5 | S1 | S1 | 55 | |
| U6 | S3 | S3 | 70 | |
| U7 | S3 | S3 | 66 | |
| U8 | S3 | S3 | 77 | |
| U9 | S3 | S3 | 78 | |

FIG. 12E

| USER | RECOMMENDED SECTION | ACTUAL SECTION | TIME (S) | EMOTION |
|---|---|---|---|---|
| U1 | S1 | S1 | 55 | RELAX |
| U1 | S2 | S2 | 11 | STRESS |
| U1 | S3 | S4 | 80 | STRESS |
| U1 | S3 | S5 | 80 | STRESS |
| U1 | S3 | S3 | 32 | RELAX |
| U2 | S1 | S1 | 55 | RELAX |
| U3 | S2 | S2 | 11 | RELAX |
| U4 | S3 | S3 | 100 | STRESS |
| U5 | S1 | S1 | 55 | RELAX |
| U6 | S3 | S3 | 70 | STRESS |
| U7 | S3 | S3 | 66 | RELAX |
| U8 | S3 | S3 | 77 | STRESS |
| U9 | S3 | S3 | 78 | RELAX |

FIG. 12F

SYSTEMS AND METHODS FOR PROVIDING NAVIGATION DIRECTIONS BASED ON EMOTIONS AND ACTIVITIES

CROSS-REFERENCE TO RELATED APPLICATION

The present application is a 35 U.S.C. 371 of International Application of PCT PCT/US2015/067649, entitled SYSTEMS AND METHODS FOR PROVIDING NAVIGATION DIRECTIONS BASED ON EMOTIONS AND ACTIVITIES, filed on Dec. 28, 2015, which claims benefit under 35 U.S.C. § 119(e) from, U.S. Provisional Patent Application Ser. No. 62/103,594, entitled "Systems and Methods for providing navigation directions based on emotions and activities", filed Jan. 15, 2015, the entire disclosure of which is incorporated herein by reference.

BACKGROUND

Databases of road networks are freely available. The increased usage of mobile devices, improved location sensing, and mobile device networking allow mobile device users to interact with the road network databases and other mobile device users while using the mobile devices to navigate.

SUMMARY

The present disclosure describes systems and methods for improved navigation assistance by providing overview directions focusing on points where other users tend to make mistakes or display emotional responses, such as stress, that indicate that they feel they may make mistakes. Current navigation systems provide the user with detailed driving directions. However, the current navigation systems lack the ability to provide key navigation guidance in scenarios where other users make, or feel they may make, a navigation mistake. Various embodiments also measure a user's attention to navigation and vary navigation guidance based on the user's measured attention to navigation.

In at least one embodiment, a navigation process receives information about a present user's navigation route, the present user's status, and user history. The navigation process compiles the received information and determines an enhanced navigation route.

In some embodiments, the navigation process is performed by a dedicated navigation system (e.g. a car's embedded navigation system, a Garmin GPS unit), by a mobile electronic device (e.g. a smart phone), by a computer network communicatively coupled with a user interface, or any other similar device or combination of devices.

The present user's navigation route may be directions for driving, walking, using public transportation, or the like. The navigation can support two-way interaction, as supported by applications such as Waze. Additionally, the navigation route may provide the user guidance while routing, wherein errors are detected based on missed turns and similar events. The present user's navigation route may also comprise the user's determined location relative to a designated route.

In some embodiments, the present user's status comprises a measured emotional status of the user, a level of background activity of the user's surroundings, the activities of the user, and the like. The user's status is detected with sensors, such as cameras for eye-gaze monitoring and facial feature recognition, a microphone to detect background noise, spoken words, and the like. The user's activities may also be determined by accessing stored information associated with the user (e.g. determining user is meeting someone for an appointment based on an event stored in an electronic calendar of the user).

In some embodiments, the user history comprises past user navigation routes and past user statuses. The user history may be either from third parties or the present user's past navigation and statuses. In other words, the navigation process may receive information on both the previous times the present user navigated along that route and information from when other users navigated along the route. The history comprises both the navigation route and the user status while on the navigation route.

In some embodiments, the enhanced navigation route comprises a navigation route that highlights critical navigation steps. The navigation process determines critical navigation steps based in part on past deviations from the route, the determined user status during past deviations, and the present determined user status. The enhanced navigation route may also summarize, or give an abbreviated navigation description, to non-critical navigation steps. Non-critical navigation steps may be determined by a low historical rate of route deviations in light of the determined present user's status.

The enhanced navigation route thus highlights areas in which the user has an increasing likelihood of making an error and/or areas where an error would result in a substantially increased travel time (e.g., where is easy to miss the correct exit, and where the next exit is not for several miles). The systems of the present disclosure focus the user's attention on critical steps of the navigation process and avoid overloading the user with unnecessary navigation steps.

BRIEF DESCRIPTION OF THE DRAWINGS

FIGS. 12A-12F depict a map and data relevant to navigating on the map, in accordance with an embodiment.

DETAILED DESCRIPTION

In some embodiments, a navigation processing system, or navigation service, is used to determine an enhanced navigation route. Example computer processing systems include cell phones, smart-phones, MP3 players, tablet computers, laptop computers, desktop computers, automobile navigation systems, radios and the like. The navigation processing may occur on a device associated with the user or on a server remote from the user. The navigation processing system may also be communicatively coupled to one or more accessories. Example accessories include a microphone, a camera, a location sensor, biometric sensors, smart watches, smart glasses, clocks, and the like.

Figure 1:
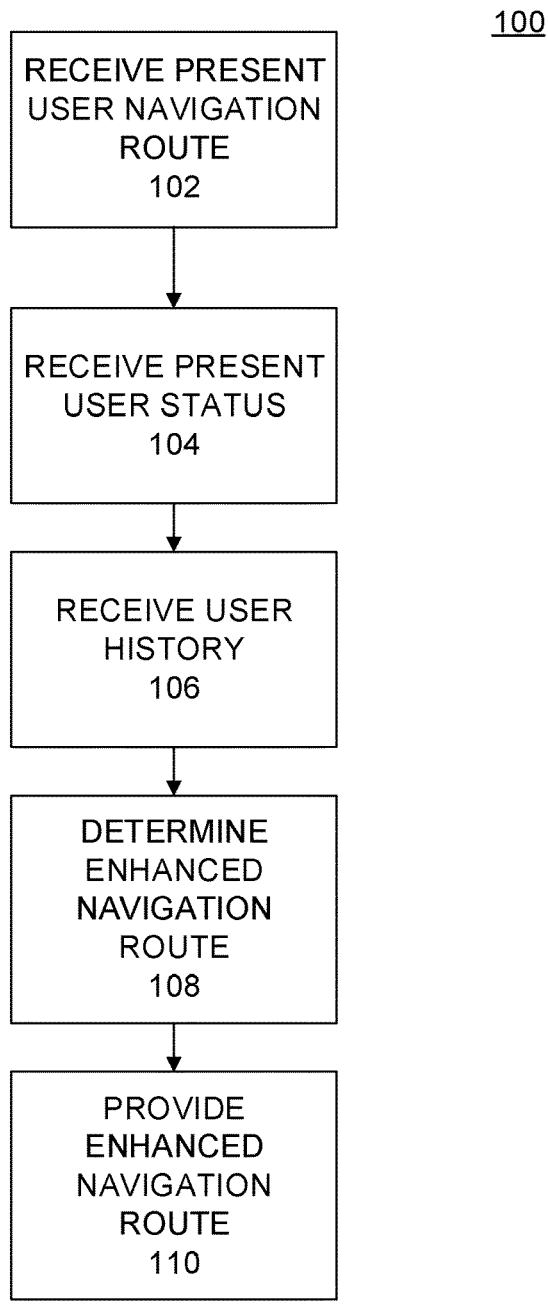
FIG. 1 depicts an example method, in accordance with an embodiment.

FIG. 1 depicts an example method, in accordance with an embodiment. In particular, FIG. 1 depicts the example method 100 performing the methods of this disclosure to determine and provide an enhanced navigation route. In at least one embodiment, a navigation service receives information about a present user's navigation route 102, the present user's status 104, and a user history 106. The navigation service compiles the received information and determines an enhanced navigation route 108. The enhanced navigation route is provided to a user at 110.

The present user navigation route 102 comprises a path for the user to follow to reach a desired destination and a series of directions provided to the user to assist the user in reaching the destination.

The present user status 104 comprises information related to the user, such as a measured heart rate, a stress level, eye gaze statistics, a user's interaction with a mobile device, and the like.

In some embodiments, the user history 106 comprises statistics on user mobility in reference to paths recommended to users. The paths consist of at least one road section and may be used to direct the user towards the user's destination.

The user history 106 may also comprise information regarding a user's location deviating from the path. A user deviating from the path may be classified as intentionally leaving the path or inadvertently leaving the path. The user is determined to have deviated from the path when a user fails to follow a recommended road section and the user is not engaging in one of a predetermined set of appropriate activities. Example activities in the predetermined set of appropriate activities may include, but are not limited to: filling gas into an automobile, charging an electric automobile, participating in some commercial transaction (e.g., paying for gas or candy bar), taking a picture, making a phone call, sending an email or SMS text message.

The navigation path may also be classified into different categories. Two successive road segments, with up to one mile on each road segment where the junction of the two segments includes an endpoint of one or more segments indicate a driving direction, such as a turn, a highway on-ramp, or a highway exit. A series of three or more successive road segments with the intermediate road segments of up to a quarter of a mile indicates a series of quick turns. Two successive road segments where the junction of the two segments includes an endpoint of one or more other segments, where the angle between the pair of road segments in the junction deviates significantly from rectangular (e.g., an angle of 30 or fewer degrees) may be considered a slight turn.

In some embodiments, the user history 106 may include a comparison of the actual paths the users have taken compared to the recommended paths, section by section.

Additionally, the user history 106 may also comprise information regarding a user's stress level while traveling along a navigation route. The user's stress level, or other negative emotions, is measured while navigating along a navigation path. Measuring a user's stress level may be accomplished by receiving biometric data from a monitor associated with a user (e.g. a heart rate monitor), monitoring the user's eye gaze, voice, and other similar actions that indicate a user's stress level, or using other known techniques to measure a user's stress level.

The user history 106 may also comprise information regarding paths identified as error-prone. A path may be identified as error-prone if a sufficient number or proportion of users inadvertently deviate from a path or if a sufficient number or proportion of users display stress while approaching or traveling on that path. The navigation service provides improved guidance for error-prone paths.

The enhanced navigation route determined at 110 comprises a path for the user to follow to reach a desired destination and directions for the user to follow to reach the destination. As compared to the present user navigation route 102, the enhanced navigation route 110 may include a different path for the user to follow, different directions for the user to follow, and a change to the format and periodicity of directions supplied to the user. In some embodiments, the navigation route may suggest a route that is less likely to result in an error, or may provide directions at a higher periodicity at error prone portions of the navigation path.

Figure 2:
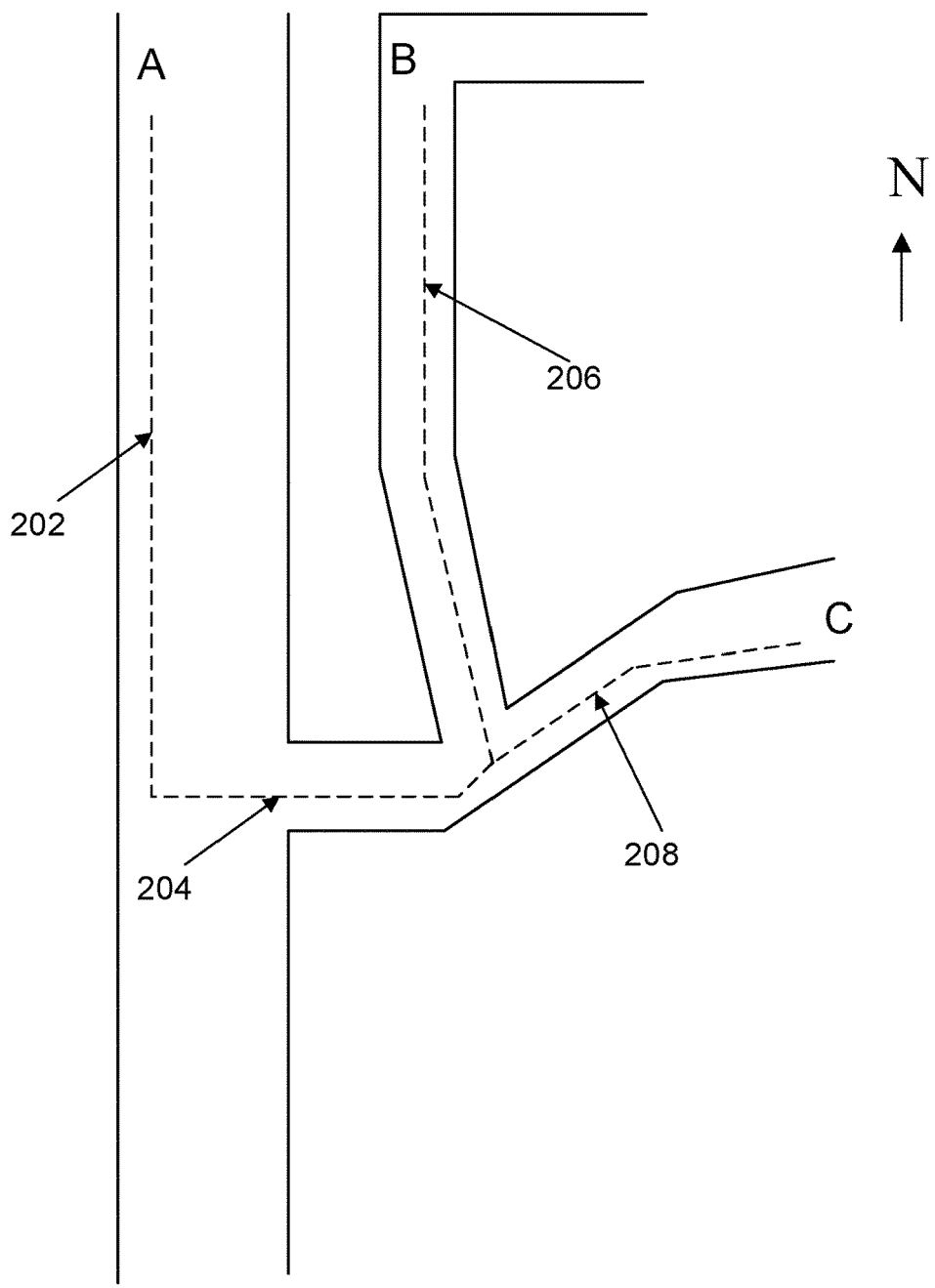
FIG. 2 depicts navigation paths, in accordance with an embodiment.

FIG. 2 depicts navigation routes, in accordance with an embodiment. In particular, FIG. 2 depicts a map 200. The map 200 comprises two navigation paths, one from Point A to Point B and another from Point A to Point C. The map includes the paths 202, 204, 206, and 208. In FIG. 2, the North direction is up. Following the navigation route from Point A to Point B in FIG. 2, a user travels south along path 202, turns East along path 204, and turns North on path 206 until reaching Point B. The navigation route may be broken up into several short sections. The overall navigation path is broken up into these shorter paths. While many users may not navigate along the complete path from Point A to Point B, many users may travel along the example segment along the first and second paths (202 and 204). The navigation service compares the user history of each short section along the whole navigation path. The navigation path from Point A to Point C is similar to the navigation path from Point A to Point B, except that the path continues East along path 208 to Point C instead of turning North to Point B along path 206.

In FIG. 2, the navigation path depicted between Point A and Point B may indicate a series of quick turns. The navigation path depicted between Point A and Point C may indicate a turn between two roads. Additionally, the shared segments of the path of the two routes depicted in FIG. 2 (paths 202 and 204) share a same user history. However, the history of users traveling over the segments extending East to Point C (along path 208) are not relevant to the navigation history for a user traveling North to Point B (along path 206). In other words, the user history for the East turn onto path 204 from path 202 is relevant to both the navigation path to Point B and Point C from Point A, however, the quick turn North onto path 206 and its associated user history is only applicable to travelers along the short segments involved in the series of quick turns on the way from Point A to Point B.

Returning to the description of FIG. 1, in some embodiments, the user history 106 may indicate the present user navigation route 102 is not typically used (e.g., incorrect, blocked for construction). The present user navigation route 102 may not be typically used if no user has used, or recently used, the path. Additionally, a path may be determined as blocked if the user commences to travel down a segment and then performs a U-Turn. Navigation paths that are not typically used may indicate that a map database is out of date and trigger a notification to the map database administrator.

In some embodiments, the navigation service 108 determines if the user has mistakenly deviated from the present user navigation route 102 based on the present user status 104. One aspect of the present user status 104 includes determining the user's activities. The user's activities can be determined by applying existing activity recognition methods. The user's activities indicate if the user has inadvertently deviated from the present user navigation route 102 or purposefully left the route.

In some embodiments, if several users travel along the recommended navigation path (especially if the more frequent users travel along the recommended navigation path) that indicates that the users who deviate from the navigation path are more likely to be inadvertently deviating from the navigation path. Example activities that indicate that a user is purposefully deviating from the navigation path may include, but are not limited to: filling gas into an automobile, charging an electric automobile, participating in some commercial transaction (e.g., paying for gas or candy bar), taking a picture, making a phone call, sending an email or SMS text message. The activity may be coordinated with the determined location in some embodiments. For example, a gasoline purchase activity coordinates with the user's location being associated with a gas station.

In response to a user intentionally or purposefully deviating from the navigation path, or taking a purposeful detour, the deviation from the navigation path will not add to the count of deviations associated with the segments. Conversely, absent a purposeful deviation, a user may mistakenly, or inadvertently, deviate from the recommended path.

To determine an enhanced navigation route, the navigation service 108 may consider segments error-prone provided the ratio of the number of observed "mistaken deviations" to total number of user trips falls within a suitable range for the prediction. Above a first threshold of deviations, a section may be classified as error-prone. An example first threshold is set at 5%. Below a second threshold of deviations, a section may be classified as users deviating from the navigation path by mistake, not as a matter of course. An example second threshold is set at 20%. The navigation service may provide explicit directions in great detail during error-prone sections.

For example, using the method 100 with the map 200 of FIG. 2, portions of a path may be determined as error-prone. The present user navigation route 102 may comprise the paths 202, 204, and 206 to provide navigation directions from Point A to Point B. To determine if the segment including path 202 and path 204 is error prone, the user history 106 may include information regarding all users that navigate over path 202 and 204, regardless if their end destination is Point B, Point C, or some other point. The number of users that inadvertently deviated from the segment that included path 202 and 204 would be compared to the number of users that did not inadvertently deviate from the path to determine an error-prone level for that section. If the error-prone level for that portion of the present user navigation route 102 exceeds a threshold value, the navigation service 108 may provide the enhanced navigation route 110. The provided enhanced navigation route 110 may take many forms, but may include providing directions at an increased periodicity to the user when navigating this section.

The user history 106 may also be situation dependent. As an example, the navigation service 108 may only consider errors in the history associated with the present time of day, day of week, weather condition, or the like of the present user. For example, a street sign may not be well lit and users may make deviations only during night hours or inclement weather. Additionally, different traffic patterns during different times of day and days of week may influence the rate of errors. A situation may be more error prone than other times when inadvertent deviations occur at a higher rate only when the situation is present.

In some embodiments, the error-prone sections are identified based on recognizing a user's emotional state. In one such embodiment, detecting that user is looking around (such as left and right) more than typical, as if seeking to find a turn, correlates to a confused state of the user; displaying a facial expression indicative of stress correlates to a confused state of the user; driving more slowly than normal for the user relative to the posted speed limit and driving conditions correlates to a confused state of the user. A confused state of the user, as input into the navigation service, indicates that deviations from the recommended navigation path are inadvertent.

In some such embodiments, sections of road are determined to be error-prone sections if a sufficient percentage of users display indications of a confused emotional state, even if the user does not deviate from the recommended navigation path. An example sufficient percentage is 20%.

In some embodiments, sections of road are determined to be error-prone sections if the fraction of users demonstrating stress and deviating from the recommended navigation path is greater than a preset threshold of 15%.

In some embodiments, sections of road are determined to be error-prone sections based on a combination of at least one of past user deviations, past user's emotional state, present user emotional state, present conditions, and past conditions. An exemplary method calculates an error-prone score based on the navigation paths, past deviations, past emotional states, and past conditions using the embodiments described herein. The navigation service may also calculate an error-prone threshold for the present user based on at least one of the user's profile (which may contain: familiarity with area, frequency of past error, determined sense of direction) and the user's determined present emotional state. The error-prone threshold for the present user indicates the level that a user is likely to inadvertently deviate. When the error-prone score for the paths exceeds the user's error-prone threshold, the navigation service may provide the user with enhanced directions.

One method to provide enhanced directions comprises displaying an augmented reality guide in front of the user. The augmented reality guide may be represented as a vehicle, or other similar object, which navigates along the recommended navigation route. The augmented reality guide may appear when the error-prone score of the navigation path exceeds a first threshold and may disappear when the error-prone score falls below a second threshold. The second threshold may be below the first threshold. The augmented reality guide may also gradually fade-in and fade-out in proportion to the level of error-proneness of the navigation path. In some embodiments, the augmented reality guide is a vehicle appearing the same as the user's vehicle. For example, the augmented reality guide may appear as an augmented reality car when the user is driving a car, an augmented reality truck when the user is driving a truck, or an augmented reality bicycle when the user is riding a bicycle.

In embodiments that include an augmented reality car as the augmented reality guide, the augmented reality car may appear to use directional signals (turn signals) and brake lights.

In embodiments that designate error-prone road sections, the navigation service may provide warnings for both potentially error-prone sections and warnings for error-prone sections.

In one embodiment, the navigation service summarizes directions for sections that are not designated as error prone.

Figure 3:
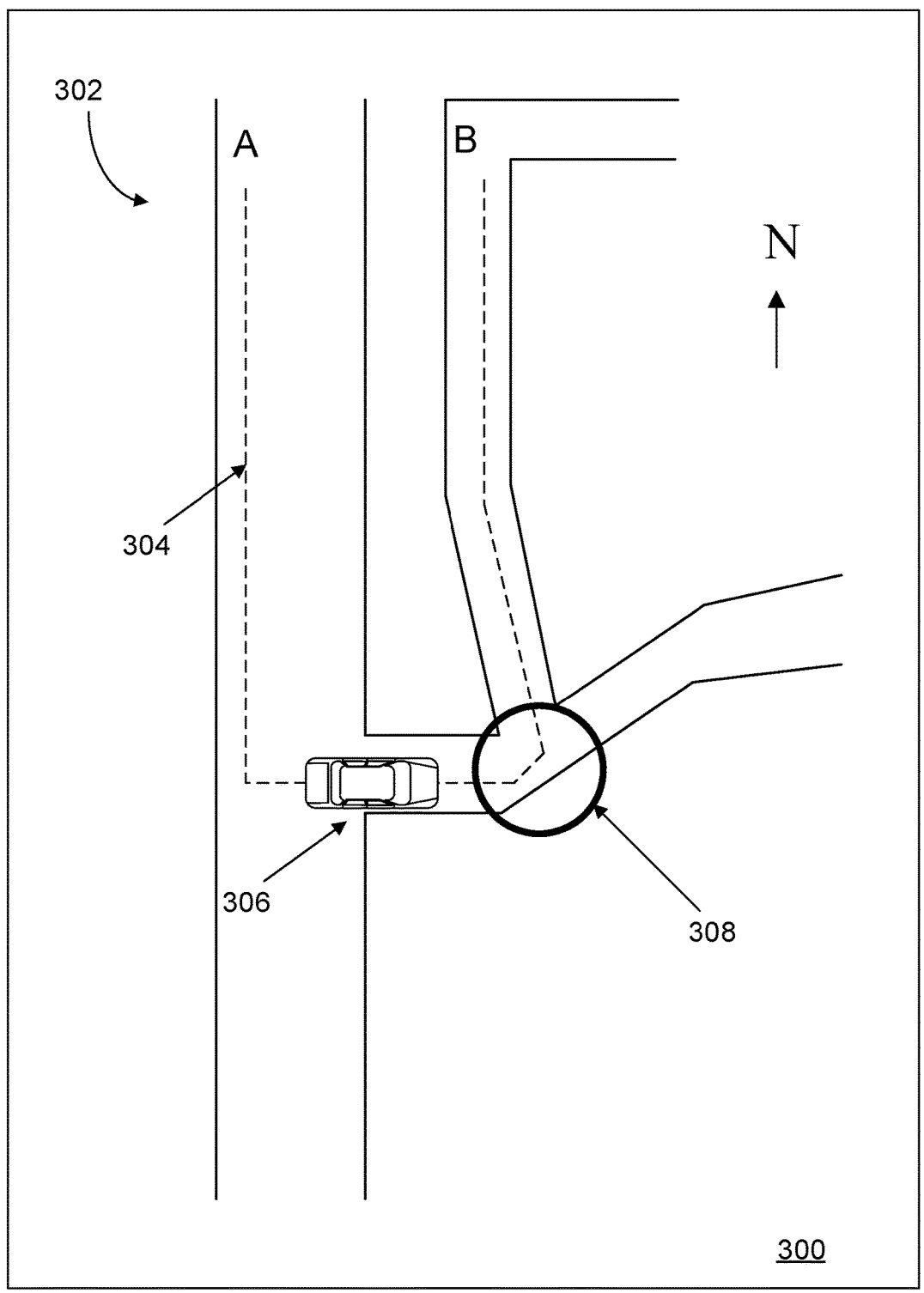
FIG. 3 depicts a user interface, in accordance with an embodiment.

FIG. 3 displays a user interface, in accordance with an embodiment. In particular, FIG. 3 depicts the user interface display 300. The user interface display 300 includes an overview of a map 302, a navigation path 304, a location indication 306 of the user, and an indication 308 (alert). The user interface display 300 may be displayed on a user's in-car navigation system, on a user's smart phone, on a user's navigation device, or the like. The navigation path 304 indicates the recommended route the user should travel to get from Point A to Point B. The location indication 306 depicts where the user is in relation to the map and navigation path. The indication 308 is an indication meaning that an error-prone section, here a turn, is ahead of the user. The example indication 308 comprises an icon located on the map at the error-prone section and is highlighted with a circle for illustration. The indication 308 may take many forms, including a circle, a star, a change in color, a flashing indication and the like.

Figure 4:
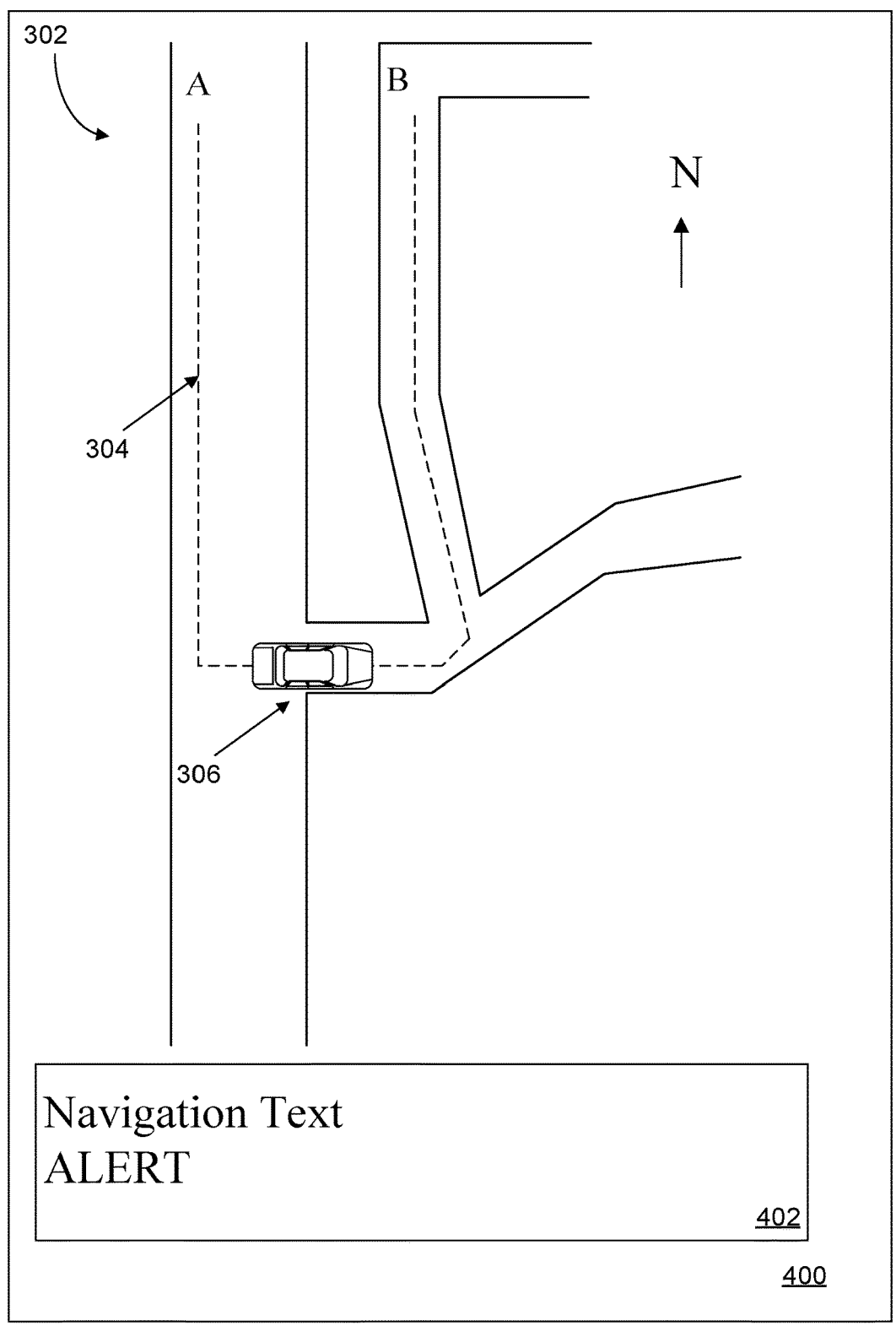
FIG. 4 depicts a user interface, in accordance with an embodiment.

FIG. 4 depicts a user interface, in accordance with an embodiment. In particular, FIG. 4 depicts the user interface 400. The user interface 400 includes some of the same aspects as the user interface 300, including the overview of the map 302, the navigation path 304, and the location indication 306. The user interface 400 also includes a text box 402. The text box includes both navigation text and an indication (alert) that an error-prone section (the same turn depicted in FIG. 3) is ahead of the user. The example indication comprises a text indication along with the directions, highlighted with an oval for illustration. The text indication can report that an error-prone area is upcoming. In some embodiments, the text indication displays details about the frequency of inadvertent deviations occur along that path.

Figure 5:
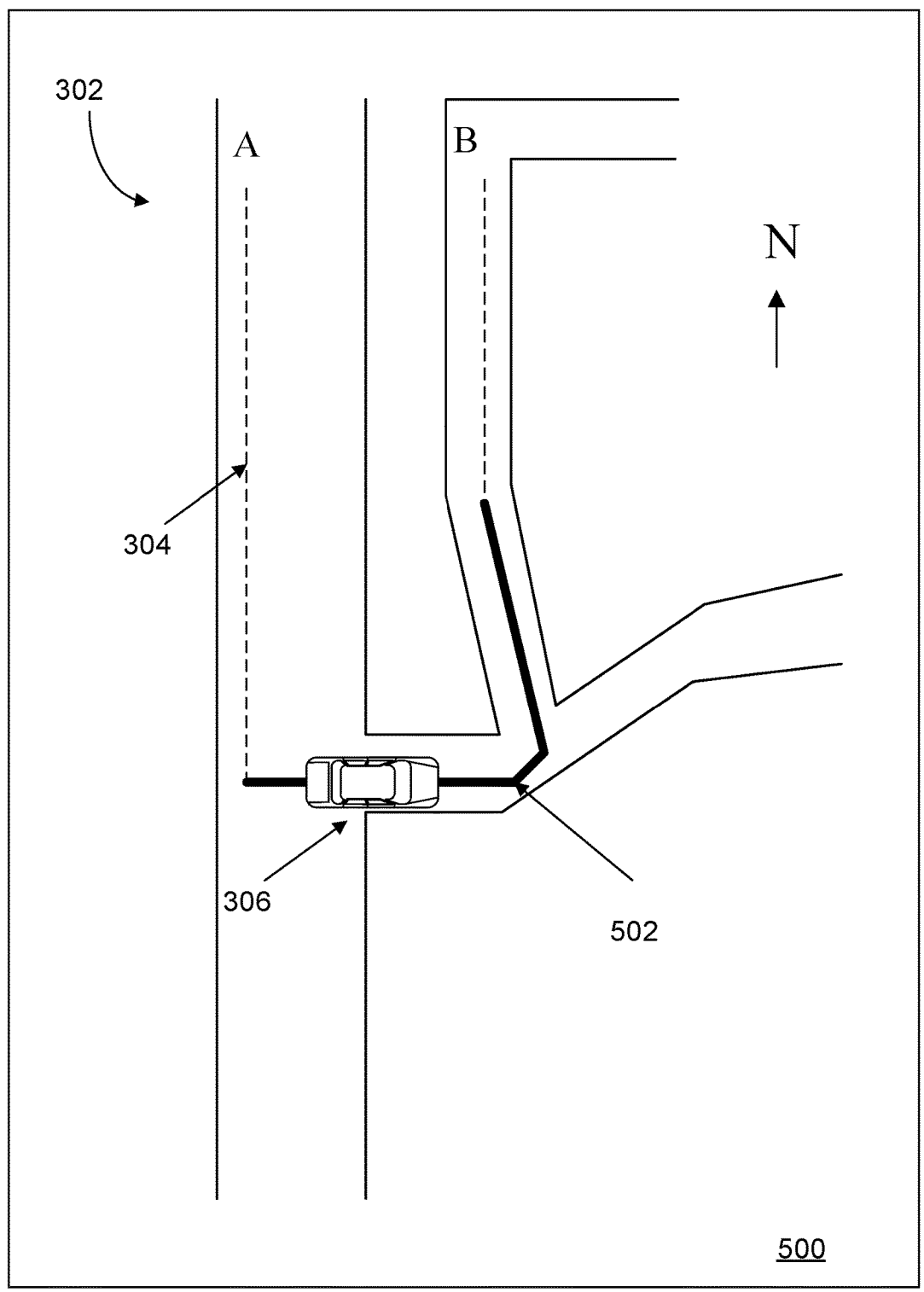
FIG. 5 depicts a user interface, in accordance with an embodiment.

FIG. 5 depicts a user interface, in accordance with an embodiment. In particular, FIG. 5 depicts the user interface 500. The user interface 500 incorporates some of the same aspects as the user interface 300, including the overview of the map 302, the navigation path 304, and the location indication 306. The user interface 500 also includes a bolded portion of the route 502. The bolded portion of the route 502 is an indication (alert) that an error-prone section (the same exit ramp depicted in FIGS. 4-5) is ahead of the user.

Figure 6:
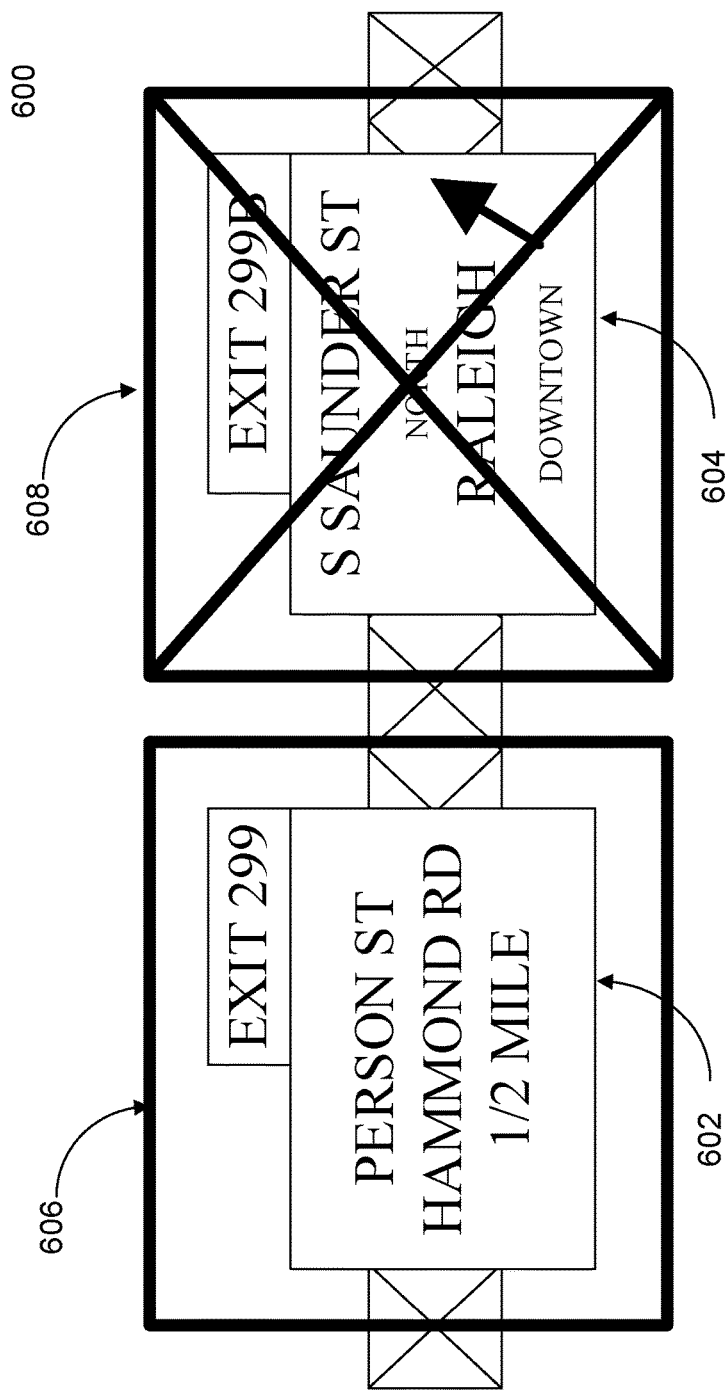
FIG. 6 depicts a user interface, in accordance with an embodiment.

FIG. 6 depicts a user interface, in accordance with an embodiment. In particular, FIG. 6 depicts a portion of a user interface 600. The portion of the user interface 600 includes a road sign 602, a road sign 604, a first annotation 606 and a second annotation 608. The portion of the user interface 600 may take several forms, including a visual depiction on an in-vehicle navigation system, a screen on a navigation device or a smart phone, or it may be a combination of augmented reality where the signs are actual signs and the indications are augmented reality overlays displayed over the road signs. In FIG. 6, the road sign 602 has is highlighted by the first annotation 606 and indicates the roads to take to follow the recommended navigation route. The road sign 604 is highlighted by the second annotation 608 and indicates the roads not to take to follow the recommended navigation route. In the user interface 600, the incorrect route may also be lowlighted (e.g., blurred or crossed out). The incorrect route may be the most frequent inadvertent deviation from the recommended path.

In some embodiments, when the user is traveling with other passengers and the navigation system determines that the navigation path is error-prone, the navigation system, through interconnected user interfaces, such as the car's audio system or instrument panel, instructs the passengers not to distract the driver. The determination that the path is error-prone can be made using any method of this disclosure, but may include the user displaying stress, the user having previously inadvertently deviated from the navigation route, or previous users inadvertently deviating from the navigation route or displaying stress.

In some embodiments, when the user is talking on a mobile phone with a third party, the process further comprises determining that the path is error prone and responsively notifying the third party that the user is unavailable to speak due to the traffic conditions. Such an embodiment may be implemented in a vehicle with built-in hands-free mobile telephone system.

In one embodiment, the level of error-proneness of a section may be updated continuously to account for any changes that may take place to the roads or road signs.

In one embodiment, inadvertent deviations from the recommended navigation path are recorded along with the environmental context. For example, the time of day, rain, snow, amount of traffic, etc. The navigation service receives the tagged environmental context as part of the user history. If users tend to make mistakes early in the morning on sunny days and miss an exit (perhaps due to glare), the environmental context is tagged along with the inadvertent deviations and are provided to the present user as part of the enhanced navigation path.

In at least one embodiment, the navigation service suggests an activity to the user based on the prior user history. The activity suggestion is based at least in part by the present user's location. However, it may be based on other events, such as detecting that the user's vehicle is low on fuel, has a flat tire, it has been a long duration since the user has last eaten or visited a rest-stop, a change in road conditions, or a task reminder. For example, the navigation service may suggest that the user stop to get gas based on prior user activities and the present user being low on gas, that the present user dial a phone number to a local mechanic based on a flat-tire indication, or shop for groceries at a particular store based on a task stored in the user's online task-management software (e.g., Wunderlist).

In one embodiment, the personal characteristics of the user are stored along with the mistakes. Exemplary personal characteristics include age, home and work locations, night vision capabilities, etc. The set of other users selected for statistical calculations are adjusted based on the characteristics of the present user. In one such embodiment, the set of other users selected for the statistical calculations are based on the social relationship with the present user.

In one embodiment, the current activity of the present user may be incorporated in addition to or instead of the present user's emotional status to determine the cognitive load on the user. A high cognitive load corresponds to the navigation service providing additional navigation guidance.

In one embodiment, if the user frequently deviates from the recommended navigation path inadvertently, the threshold for highlighting error-prone segments is lowered so that more help is provided to the user in the form of increased navigation aids and the like.

In one embodiment, deviations from the recommended navigation path are classified as purposeful or inadvertent based on the reason that users that deviate from the path purposefully stay on the deviated path for a longer duration. For example, to buy gas, drop off a package, buy wine on the way to a party or drive along a particular path for its view. In one such embodiment, the time taken by a user to stop or alter the direction of travel after deviating from the recommended path is measured. A longer duration indicates that the user purposefully deviated from the recommended navigation path. The time taken by a user in a stop after deviating inadvertently is shorter. A section of a navigation path is determined to be error-prone if the ratio of the number of users taking and quickly attempting to undo a detoured movement to the total number of users passing through the section is low.

In some embodiments, the navigation service recognizes inadvertent violations of regulations, such as speeding after a reduction in the posted speed limit.

In some embodiments, the navigation service either incorporates either one or both of a passenger's emotions and user history. For example, if the passenger previously expressed confusion or previously inadvertently deviated from the suggested route, which is the same as the present suggested navigational route, such information may contribute to a determination that the navigation path is error-prone.

Figure 7:
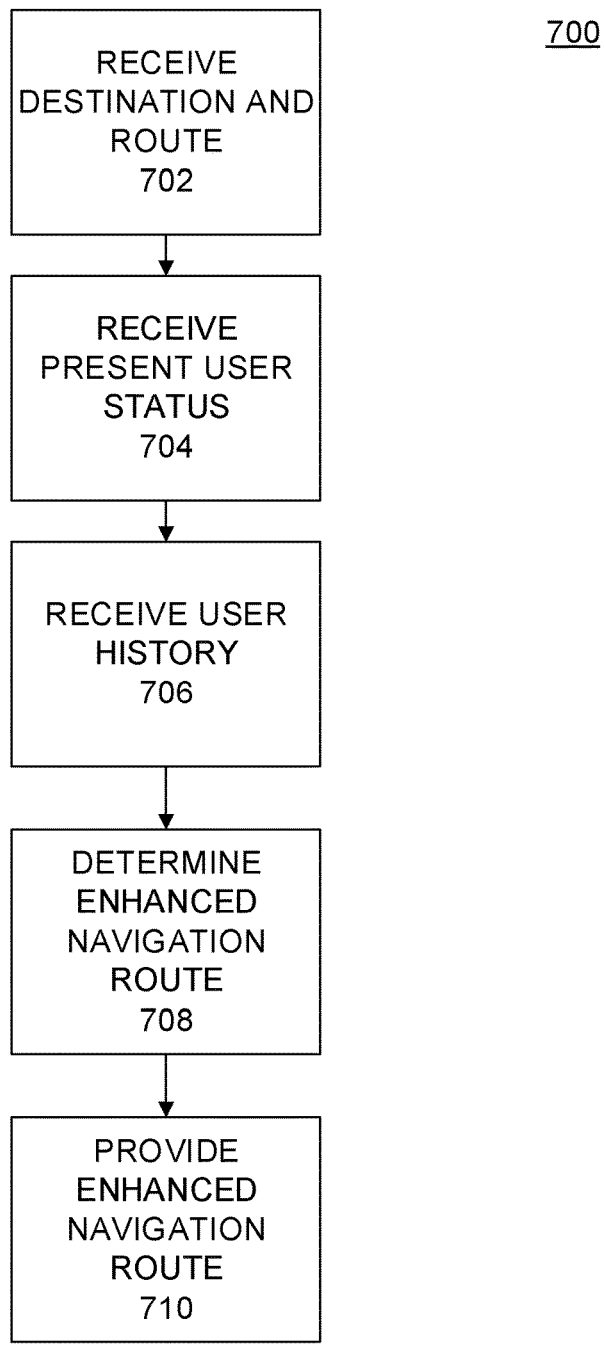
FIG. 7 depicts an overview of a navigation service, in accordance with an embodiment.

FIG. 7 depicts an overview of a navigation method, in accordance with an embodiment. In particular, FIG. 7 depicts the navigation method 700. The navigation method 700 includes receiving destination and route information 702, a present user's mobility and emotional status 704, and other users' mobility, activities, emotions and routes 706. An enhanced navigation route is determined at 708 and provided to a user at 710.

Figure 8:
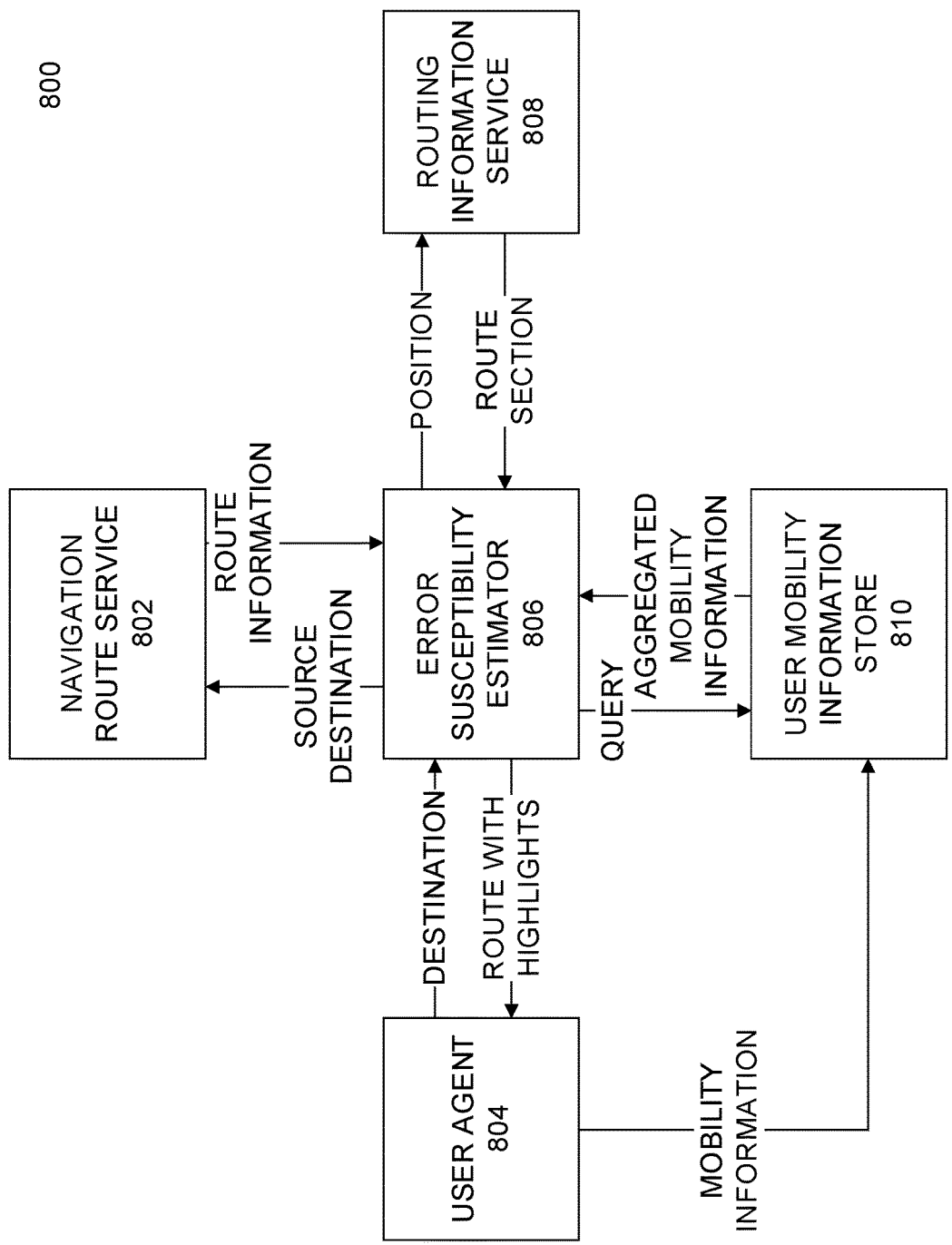
FIG. 8 depicts a block diagram of a navigation service, in accordance with an embodiment.

FIG. 8 depicts a block diagram of a navigation service, in accordance with an embodiment. In particular, FIG. 8 depicts the block diagram 800. The navigation service 800 may be used to perform the method 700 or other methods described herein. The block diagram 800 includes a Navigation Route Service 802, a User Agent 804, an Error Susceptibility Estimator 806, a Routing Information Service 808, and a User Mobility Information Store 810. In the system of FIG. 8, the Error Susceptibility Estimator 806 provides the Navigation Route Service 802 with a source destination and receives from the Navigation Route Service 802 route information of a recommended navigation route. The Error Susceptibility Estimator 806 provides the user's position to the Routing Information Service 808 and receives information applicable to the route sections from the Routing Information Service 808. The Error Susceptibility Estimator 806 provides a User Mobility Information Store 810 a query related to the navigation process and receives the aggregated mobility information related to the query from the User Mobility Information Store 810. The Error Susceptibility Estimator 806 provides the User Agent 804 a route with highlights and receives a user destination. The User Agent 804 also provides mobility information to the User Mobility Information Store 810.

The User Agent 804 provides the destination for the user. The destination of the user may also include route preferences, such as avoiding tolls, using ferries, optimizing for fuel efficiency, and the like. The User Agent 804 also tracks a user's mobility and status and provides this information to the Error Susceptibility Estimator 806 and the User Mobility Information Store 810.

The User Mobility Information Store 810 captures the mobility and status information of all users. It provides aggregated mobility information pertaining to the selected navigation sections on demand.

The Navigation Route Service 802 provides a route from the specified source, or starting location to the specified destination. The Navigation Route Service 802 may also receive user preferences received from the User Agent 804.

The Routing Information Service 808 provides information about the requested road sections. It provides information in the form of connectivity between nodes (points or intersections) and may include geometric information about road sections as known in the prior art. In some embodiments, the Navigation Route Service 802 and the Routing Information Service 808 are deployed in the same service as they both rely on the same kind of information.

The components the block diagram 800 depicted in FIG. 8 are also used to perform the steps and methods described herein. For example, the User History 106 of FIG. 1 can perform some of the functions of the User Mobility Information Store 810.

Figure 9:
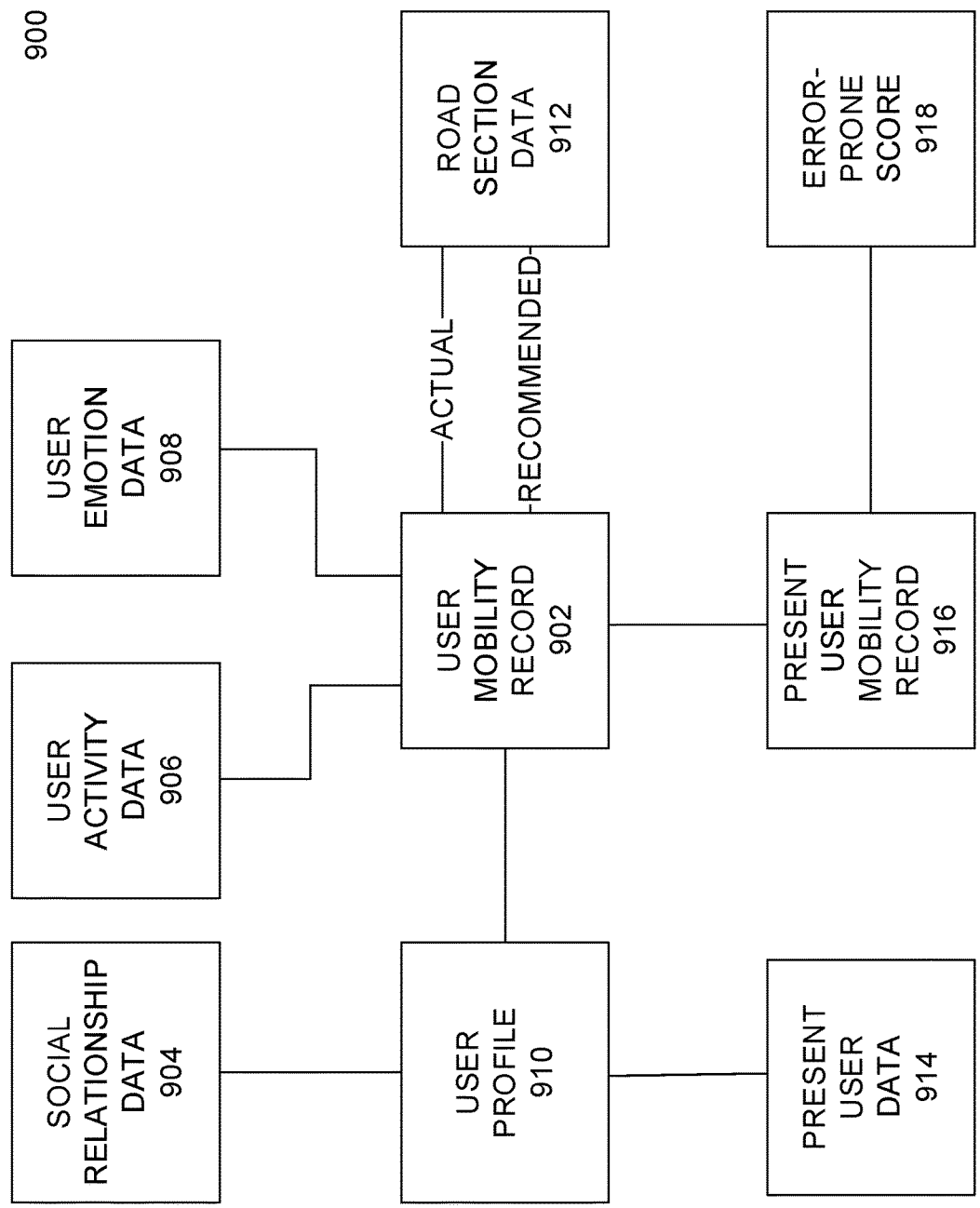
FIG. 9 depicts a block diagram of a system architecture, in accordance with an embodiment.

FIG. 9 depicts a block diagram of a system architecture, in accordance with an embodiment. In particular, FIG. 9 depicts the system architecture 900. The system architecture depicts aspects of the User Mobility Record 902. The system architecture 900 includes the user mobility record 902, social relationship data 904, user activity data 906, user emotion data 908, a user profile, road section data 912, a present user profile 914, a present user mobility record 916, and an error-prone score 918. The user mobility record 902 compiles the monitored information about user profile 910 including the actual and recommended road section data 912 they are on, user activity data 906, and user emotion data 908. The user profile 910 includes information about a user, such as the user's age, identity and ability to see well at night. The ID shown for a User need not be associated with the real-life identity of a user but may be a pseudonym. The social relationship data 904 associates two or more users with one another. The present user data 914 is an instance of the user profile 910 and the present user mobility record 916 is an instance of the user mobility record 902. Thus, these entities have the same attributes and relationships. The error-prone score 918 is computed and may or may not be stored and applies to the present user mobility record 916 and indirectly to the present user 914.

Figure 10:
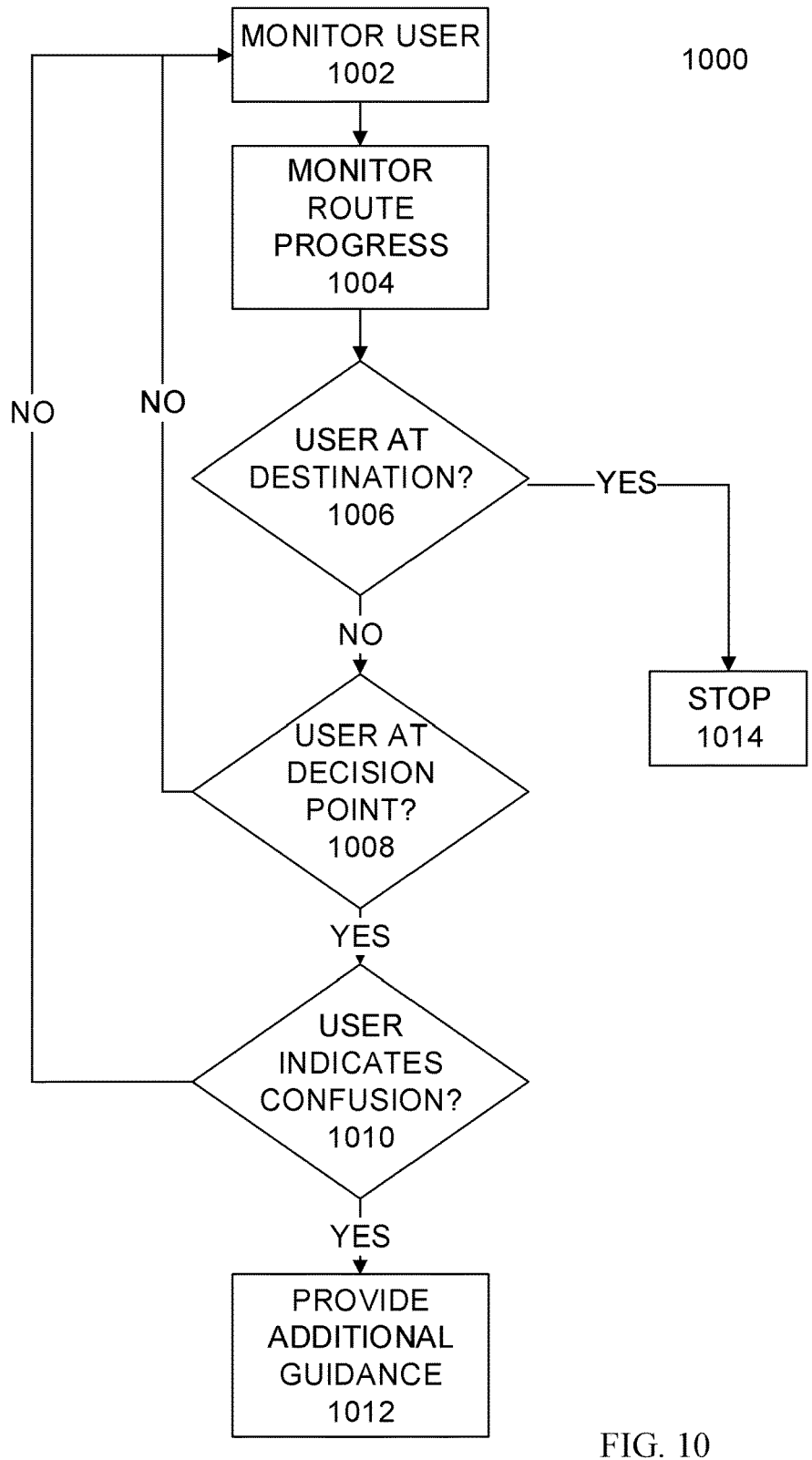
FIG. 10 depicts a flowchart of methods to provide enhanced navigation, in accordance with an embodiment.

FIG. 10 depicts a flowchart in accordance with an embodiment. In particular, FIG. 10 depicts the flowchart 1000. In the flowchart 1000, a user is monitored at 1002. The user's position, activities, and emotions are monitored and tracked with respect to the recommended route. At 1004, the user's progress along the navigation path is monitored. If the user is at the destination at 1006, the process stops at 1014. At 1008, as the user approaches a decision point, the user's activities and emotional that was monitored at 1002 are analyzed to detect confusion or frustration. If the user is engaged in other activities (high cognitive load), is displaying emotional unease (is confused), or a combination, the navigation service provides the user additional guidance through highlighting the route at 1012.

Figure 11:
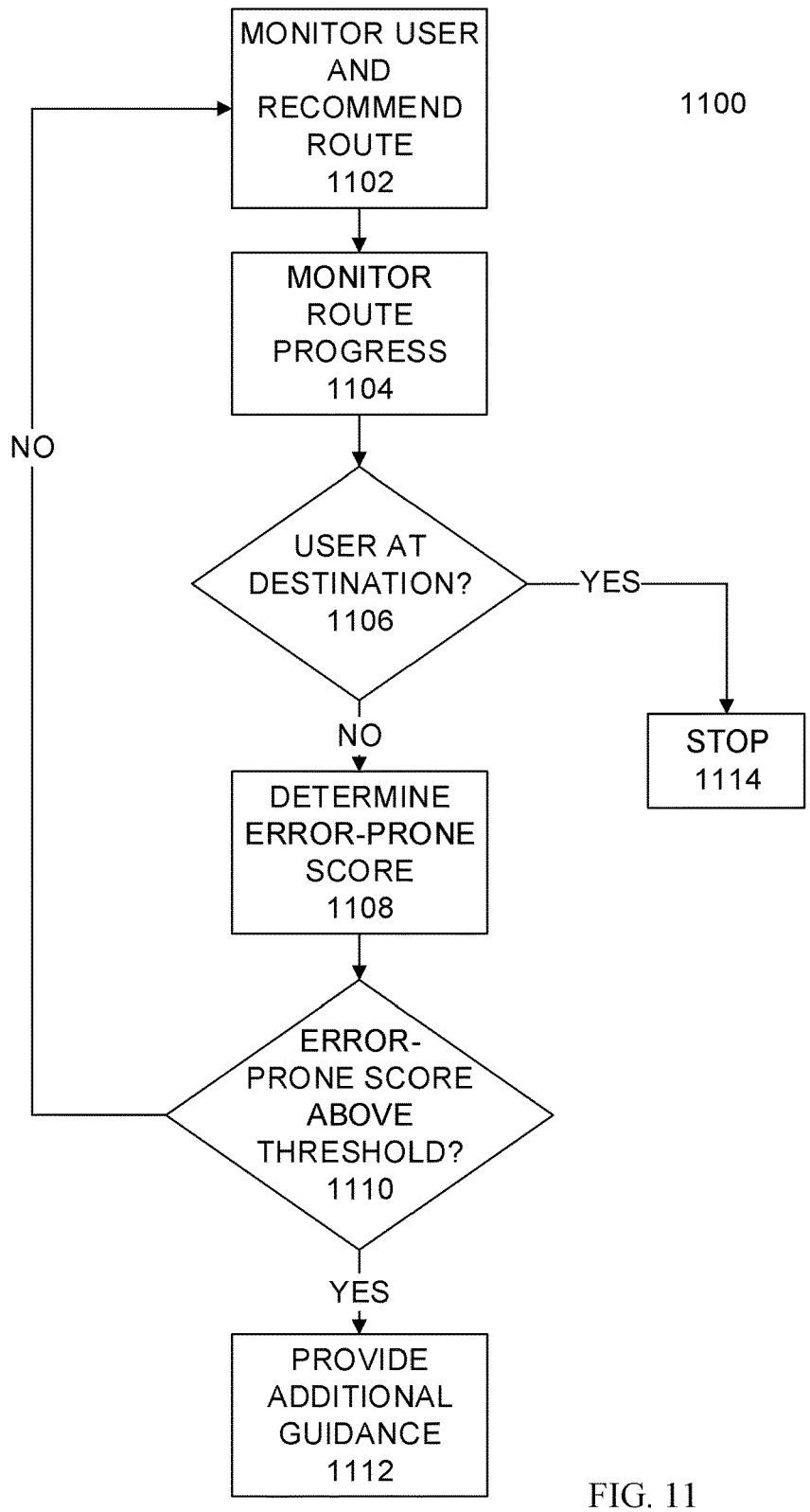
FIG. 11 depicts a flowchart, in accordance with an embodiment.

FIG. 11 depicts a flowchart, in accordance with an embodiment. In particular, FIG. 11 depicts the flowchart 1100. In the flowchart 1100, a user is monitored and a navigation route is recommended at 1102. The user's position, activities, and emotions are monitored and tracked with respect to the recommended route. At 1104, the user's position along the route is monitored. If the user is at the destination at 1106, the process stops at 1114. At 1108, an error-prone score is determined. As the user approaches a decision point, and along the series of navigation sections, statistics are computed for that road section using information available from other user's data regarding deviations from their recommended routes, their activities when deviating, and their emotions whether deviating or not. If the statistics indicate that the user is approaching an error-prone section and the error-prone score for that portion of the navigation route exceeds a threshold, additional navigational information is provided to the user at 1112.

In some embodiments, a user interface is able to present the user with navigational tips. Example user interfaces are available in the prior art.

In some embodiments, the navigation service determines multiple options for navigation paths and calculates an overall error-prone score, which may be related to an overall stress exerted on a user while navigating along each recommended route. In some such embodiments, the user selects a navigation route based on, among other factors, a calculated stress score. The stress score may be dependent only on past user history, or may also incorporate the present user's profile, including familiarity with the area, past experiences driving through similar navigation sections, and the like. For example, while navigating through a city, a user may be presented with the option to drive slightly further or take a slightly longer time, but have a lower stress score while driving down main roads of the city, or the user may be presented with a faster and shorter navigation path that has a higher stress score and incorporates driving down one-way streets and along other areas that may have a high error-prone score.

In an exemplary embodiment, a method or process is implemented on a computer or programmed device programmed with executable instructions.

Figure 12A:
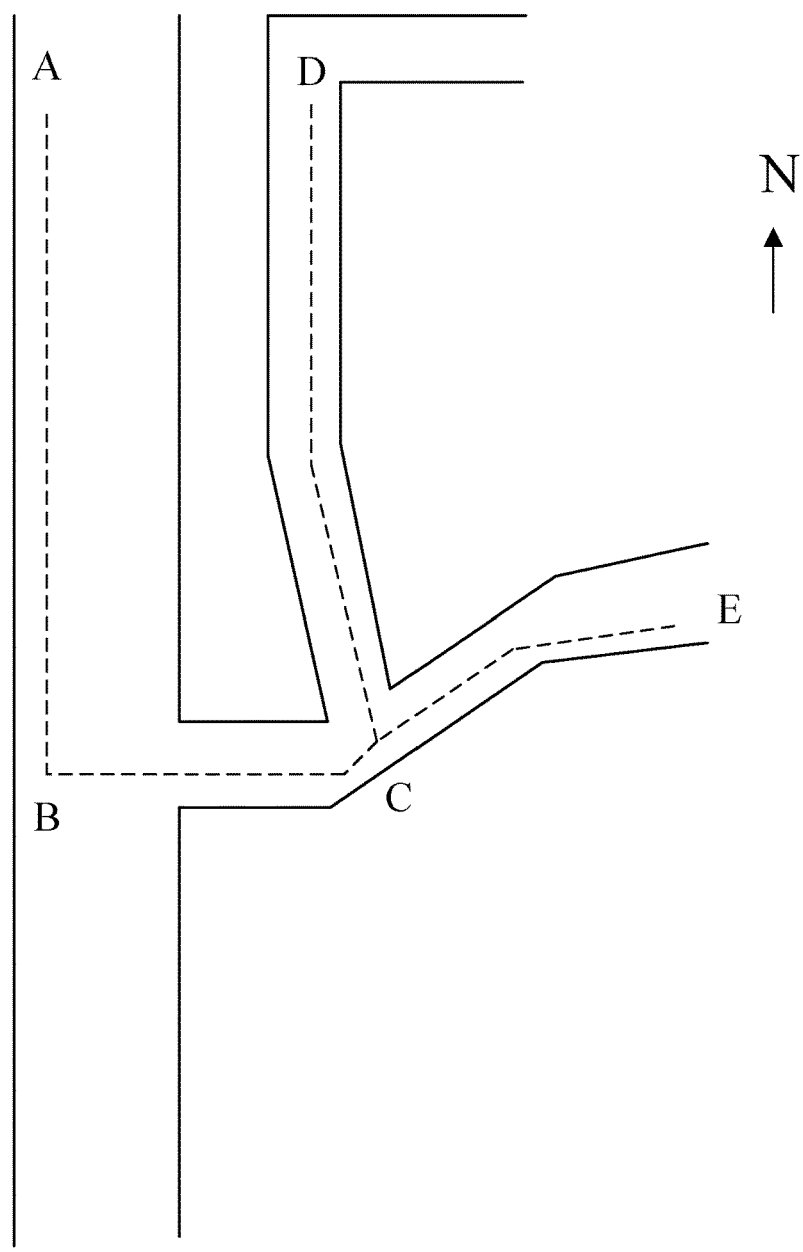

FIG. 12A-12F depicts a map and data relevant to navigating on the map. In particular, FIG. 12A depicts the map 1200 and five data points, A, B, C, D, and E which correlate to road sections on the map 1200. In some embodiments the statistics are used to determine an enhanced navigation route.

FIG. 12B depicts statistics for navigation information between different nodes (A-E). For example, the path between Node A to Node B is labeled as Section S1 and has a mean travel time of 60 seconds.

FIG. 12C depicts statistics for navigation information (recommended Section and Actual Section) along different sections (S1-S5) for different users (U1-U9). The navigation service monitors users' recommended and actual routes to determine the error-proneness of a road section.

FIG. 12D depicts information relating to a user navigating along Section S2. In particular, User U0 is traversing road section S2 and is approaching the decision point from where U0 will need to travel on road section S3. Utilizing the data of FIG. 12C, of the six users (U1, U4, U6, U7, U8, and U9) recommended to take road section S3 next, one user (U1) deviated from the recommended road section. Therefore the deviation for this road section is 17%. This value is between the first and second thresholds of 5% and 20% and the road section is determined to be error-prone.

FIG. 12E depicts information relating to recommended sections, actual sections, time taken, and identified activities. In the example table FIG. 12E, User U4 was recognized as deviating from the recommended section S3 for the identified activity of filling gas. Thus, the deviation was purposeful, and not inadvertent. User U4's purposeful deviation from the recommended route is not included in the error-prone statistical analysis.

FIG. 12F depicts information relating to tracking a user's emotional state during navigation. The following example determines if sections S2 and S3 are error-prone, potentially error prone, or neither. Two users (U1 and U3) were recommended to take road section S2 and both took S2 correctly. However, U1 was assessed to be under stress. Therefore, the fraction of stressed but non-deviating users is 50%, which is above the predetermined threshold of 20%, thus Section S2 is potentially error-prone.

Six users (U1, U4, U6, U7, U8, and U9) were recommended to take road section S3. Of these users, one user (U1) deviated from the recommended road section. Moreover, U1 was stressed at that time. Therefore the fraction of stressed, deviating users for this road section is 17%. This value falls above the threshold of 15%, thus the road section is determined to be error-prone.

In some embodiments, the user's emotional status is measured. Emotional status is measured with affective technology, which infers a person's emotions (i.e., emotional states, moods, and/or the like). The affective technology devices make such inferences based at least in part on one or more physiological parameters such as heart rate, pupil dilation, and the like (i.e., biometric data). In some embodiments, affective technology devices compare absolute values of such parameters with thresholds. In some embodiments, the affective technology devices compare changes, or deltas, in the values over a period of time. In some embodiments, affective technology devices infer one or more emotions of one or more people at least in part by detecting one or more facial expressions.

In some embodiments, a user's activities are recognized. Known activity recognition systems are capable of recognizing the activity that the user is performing. Additionally, smartphones support activity recognition and can recognize whether a user is running, walking, standing, or sitting, as described in M. Kose et al. "Online Human Activity Recognition on Smart Phones," 2nd International Workshop on Mobile Sensing, Apr. 16, 2012, Beijing, China. Some examples, but not an exhaustive list, of activity recognition approaches include:

- Walking running, driving, standing still, (used, e.g. by the Android operating system)
- Eating, drinking speaking, laughing, coughing, as described in K. Yatani, K. N. Truong "Bodyscope: a wearable acoustic sensor for activity recognition," UbiComp' 12, Sep. 5-Sep. 8, 2012, Pittsburgh, USA.
- Sleeping, (e.g. as employed in the Jawbone UP and the Azumio application)
- Making a sandwich, as described in A. Fathi et al. "Learning to Recognize Objects in Egocentric Activities," International Conference on Computer Vision (ICCV) 2011.

Figure 13:
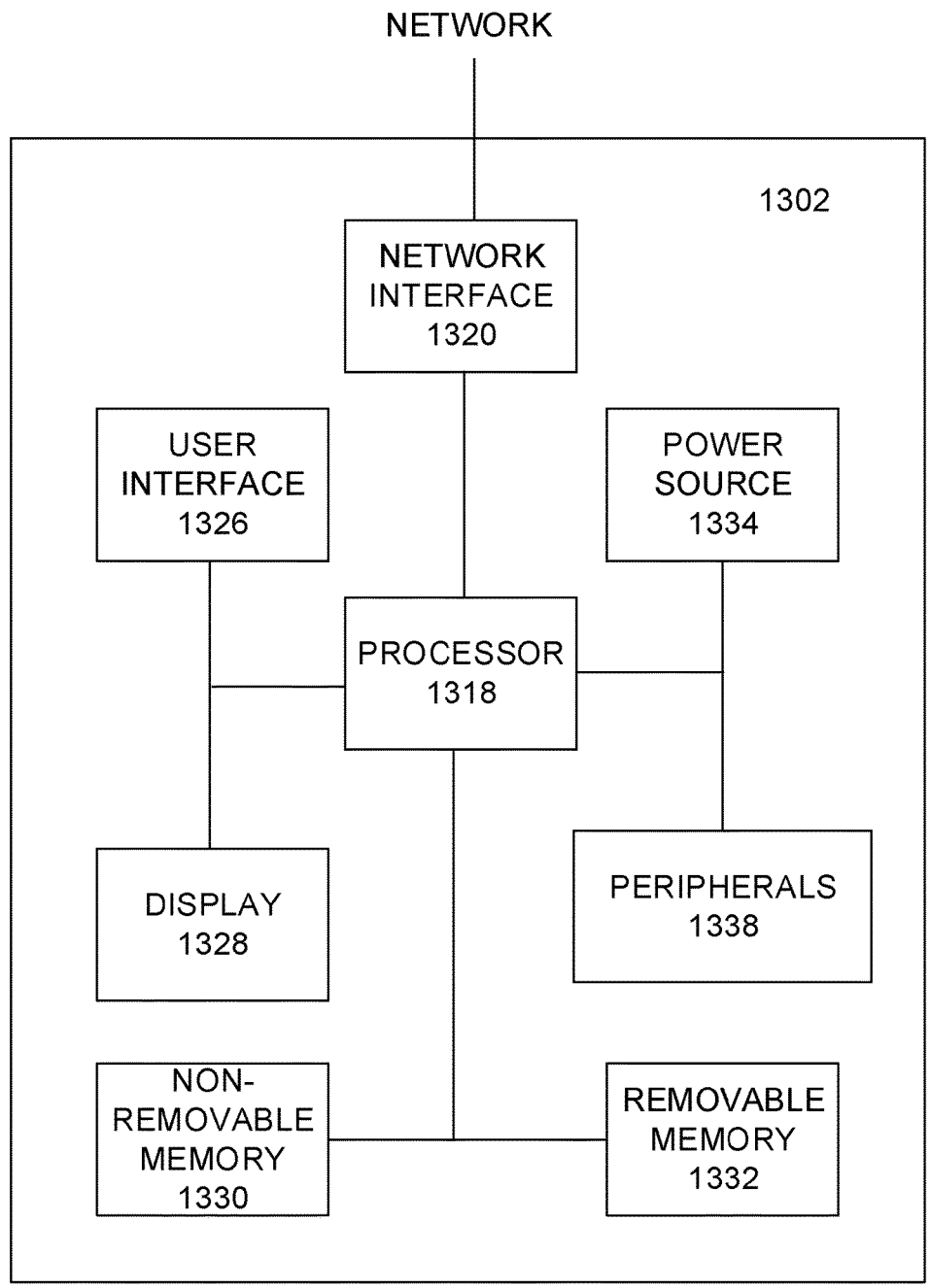
FIG. 13 depicts a schematic functional block diagram of a computer processing system, in accordance with some embodiments.

FIG. 13 depicts a schematic functional block diagram of a computer processing system in accordance with some embodiments. Throughout the disclosure the term "navigation service" is used to refer to a computer processing system capable of carrying out the methods described herein. Example computer processing systems include smart phones, phones, laptops, computers, car navigation systems, and the like. The computer processing systems may be connected to remote and local networks or other remote computer processing systems. The functions described as being carried out in one computer processing system may also be carried out in a remotely connected computer processing system, as known by those with skill in the relevant art. It may be appreciated that the methods of this disclosure are completed on multiple computer processing systems which are communicatively coupled together.

In some embodiments, the systems and methods described herein may be implemented in a computer processing system, such as the computer processing system 1302 illustrated in FIG. 13. As shown in FIG. 13, the computer processing system 1302 may include a processor 1318, a network interface 1320, a user interface 1326, a display 1328, a non-removable memory 1330, a removable memory 1332, a power source 1334, and other peripherals 1338. It will be appreciated that the server 1302 may include any sub-combination of the foregoing elements while remaining consistent with an embodiment. The server may be in communication with the internet and/or with proprietary networks.

The computer processing system 1302 can incorporate the embodiments of this disclosure. For example, the peripherals 1338 may include the internal sensor, the external sensor, and any optional auxiliary sensors. The display 1328 may include the virtual reality display, and any optional audio speakers. The network interface may include the communication interface.

The processor 1318 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 1318 may perform signal coding, data processing, power control, input/output processing, and/or any other functionality that enables the server 1302 to operate in a wired or wireless environment. The processor 1318 may be coupled to the network interface 1320. While FIG. 13 depicts the processor 1318 and the network interface 1320 as separate components, it will be appreciated that the processor 1318 and the network interface 1320 may be integrated together in an electronic package or chip.

The processor 1318 of the server 1302 may be coupled to, and may receive user input data from, the user interface 1326, and/or the display 1328 (e.g., a liquid crystal display (LCD) display unit or organic light-emitting diode (OLED) display unit). The processor 1318 may also output user data to the display/touchpad 1328. In addition, the processor 1318 may access information from, and store data in, any type of suitable memory, such as the non-removable memory 1330 and/or the removable memory 1332. The non-removable memory 1330 may include random-access memory (RAM), read-only memory (ROM), a hard disk, or any other type of memory storage device. In other embodiments, the processor 1318 may access information from, and store data in, memory that is not physically located at the server 1302, such as on a separate server (not shown).

The processor 1318 may receive power from the power source 1334, and may be configured to distribute and/or control the power to the other components in the server 1302. The power source 1334 may be any suitable device for powering the server 1302, such as a power supply connectable to a power outlet.

Figure 14:
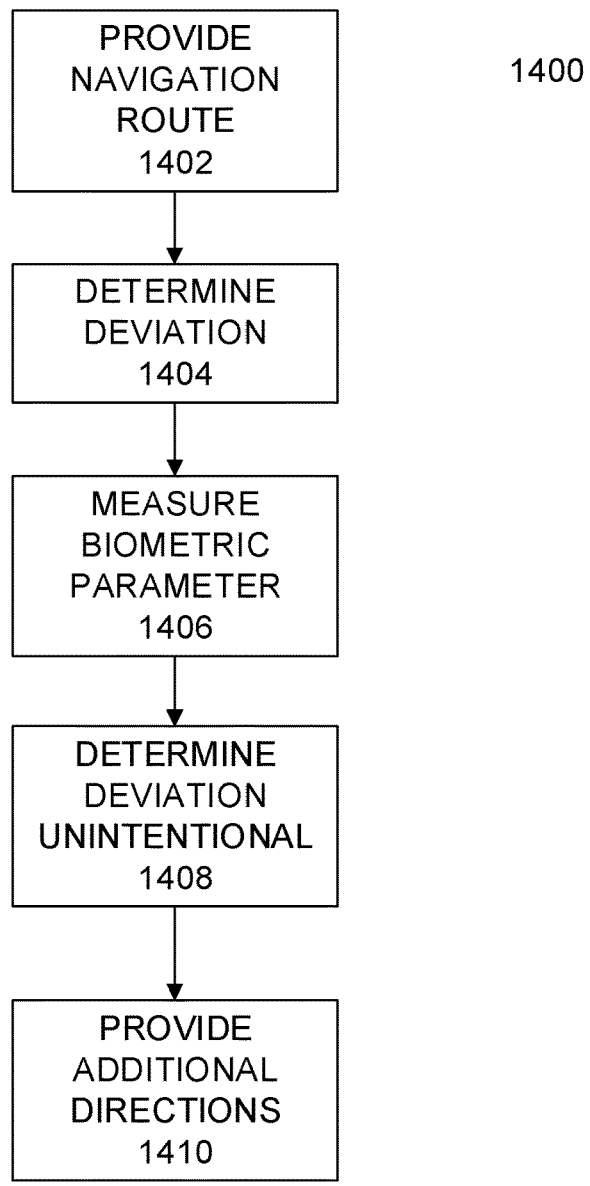
FIG. 14 depicts an example method, in accordance with an embodiment.

FIG. 14 depicts an example method, in accordance with an embodiment. In particular, FIG. 14 depicts the example method 1400. The example method 1400 includes providing a suggested navigation route to a user at 1402, determining that the user has deviated from the route at 1404, measuring a user's biometric parameter at 1406, and determining, based at least in part on the measured biometric parameter, whether the user's deviation from the route is unintentional at 1408, and in response to the determination that the user's deviation is unintentional, providing the user with additional directions at 1410.

At 1402, a suggested navigation route is provided to the user. The suggested navigation route includes a path for the user to follow to reach a desired destination and directions to follow the path.

At 1404, a determination is made if the user has deviated from the suggested navigation route. The determination that the user has deviated from the suggested navigation route can be by comparing the location of a device associated with the user, such as the user's mobile phone or in-car navigation system, with the location of the suggested navigation route.

At 1406, a user's biometric parameters are measured. Example biometric parameters include a user's heart rate, eye-gaze movements, blood pressure, facial expressions, and the like. The user's biometric parameters may further aide in determining a stress level of the user.

At 1408, a determination is made if the user's deviation was unintentional. The determination is made at least in part from the measured biometric parameters. The stress level may also be used to determine if the deviation was intentional or unintentional. For example, a high measured stress level may correlate to an unintentional deviation.

At 1410, additional directions are provided to the user if the deviation was unintentional. The additional directions may be the same directions at an increased periodicity, directions made to return the user to the previously suggested navigation path, in the form of an audio alert, a visual alert, or the like.

Figure 15:
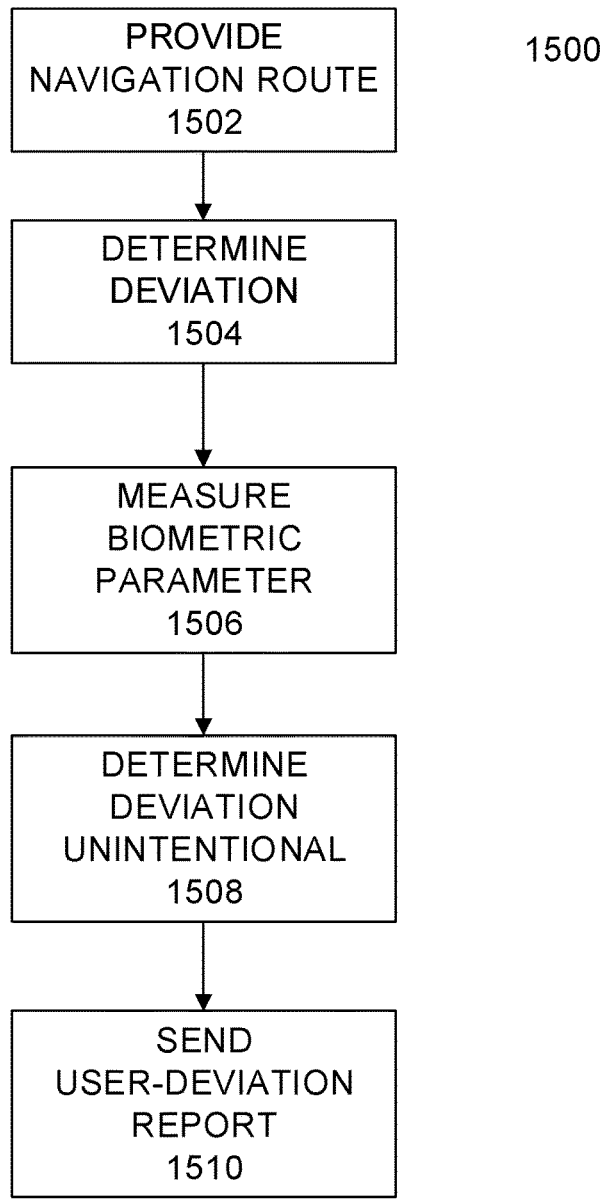
FIG. 15 depicts an example method, in accordance with an embodiment.

FIG. 15 depicts an example method, in accordance with an embodiment. In particular, FIG. 15 depicts the example method 1500. The example method 1500 includes providing a suggested navigation route to a user at 1502, determining that the user has deviated from the route at 1504, measuring a user's biometric parameter at 1506, and determining, based at least in part on the measured biometric parameter, whether the user's deviation from the route is unintentional at 1508, and in response to the determination that the user's deviation is unintentional, sending the user with additional directions at 1510.

The steps 1502-1508 are similar to the steps 1402 to 1408 of FIG. 14. At step 1510, a user-deviation report is sent in response to a determination that the deviation was unintentional. The user-deviation report may include information regarding the user's measured biometric parameters, the location of the user, and the like.

The user-deviation reports may be used to determine an error-prone score of a portion of a navigation route. Based on an error-prone score of a portion of the navigation route exceeding a threshold value, additional directions may be provided to other user's navigating the error-prone portion of the navigation route in advance of the other user's deviating from the navigation path.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

The invention claimed is:

1. A method comprising:
   providing a suggested navigation route to a user;
   determining that the user has deviated from the route;
   measuring at least one biometric parameter of the user to determine a stress level of the user;
   determining, based at least in part on the determined stress level, whether the user's deviation from the route is unintentional; and
   in response to a determination that the user's deviation is unintentional, providing the user with additional directions.

2. The method of claim 1, further comprising, in response to the determination that the user's deviation from the route is unintentional, sending, to a remote server, a user-deviation report.

3. The method of claim 1, wherein the biometric parameter is heart rate.

4. The method of claim 1, wherein providing the user with additional directions comprises depicting an icon on a user interface.

5. The method of claim 1, wherein providing the user with additional directions comprises providing an audio alert.

6. The method of claim 1, wherein providing the user with additional directions comprises providing a warning on a user interface.

7. The method of claim 1, wherein providing the user with additional directions comprises displaying an augmented-reality guide vehicle in front of the user.

8. The method of claim 1, wherein the user's deviation is determined to be unintentional when the measured biometric parameter exceeds a first threshold.

9. The method of claim 1, further comprising recognizing an activity of the user, and wherein determining whether the user's deviation from the route is unintentional is further based on the recognized activity.

10. The method of claim 9, wherein the recognized activity is the user making a purchase, and wherein the user's deviation from the route is determined to be intentional in response to recognition that the user is making a purchase.

11. A method comprising:
    providing a suggested navigation route to a user;
    determining that the user has deviated from the route;
    measuring at least one biometric parameter of the user;
    determining, based at least in part on the biometric parameter, whether the user's deviation from the route is unintentional; and
    in response to a determination that the user's deviation from the route is unintentional, sending, to a remote server, a user-deviation report.

12. The method of claim 11, further comprising determining an error-prone score based on the received user-deviation report.

13. The method of claim 12, wherein the error-prone score is determined based on a number user-deviation reports received and a number of users navigating along the navigation route.

14. The method of claim 12, wherein the navigation route comprises a plurality of segments, and the error-prone score is determined for each segment in the plurality of segments.

15. The method of claim 12, further comprising providing additional navigation directions to the user in response to the error-prone score exceeding a threshold.

16. The method of claim 15, wherein the threshold is 15 percent.

17. The method of claim 15, wherein the additional directions comprise audio directions.

18. The method of claim 12, further comprising determining a second user is approaching an error-prone segment and alerting the second user of the error-prone score.

19. The method of claim 12, further comprising determining environmental conditions during the deviation and wherein determining an error-prone score is further based on the determined environmental conditions.

20. The method of claim 19, wherein the environmental conditions comprise the time of day.

21. The method of claim 19, wherein the environmental conditions comprise the weather conditions.

22. The method of claim 11, further comprising recognizing an activity of the user, and wherein determining whether the user's deviation from the route is unintentional is further based on the recognized activity.

23. The method of claim 22, wherein the recognized activity is the user making a purchase, and wherein the user's deviation from the route is determined to be intentional in response to recognition that the user is making a purchase.

24. A system comprising a processor and a non-transitory computer-readable medium, the medium storing instructions that are operative, when executed by the processor:
    to provide a suggested navigation route to a user;
    to determine that the user has deviated from the route;
    to measure at least one biometric parameter of the user to determine a stress level of the user;
    to determine, based at least in part on the determined stress level, whether the user's deviation from the route is unintentional; and
    in response to a determination that the user's deviation is unintentional, to provide the user with additional directions.

* * * * *